May 15, 1928.
M. A. CLARK
1,669,739
PRESSURE REGULATING VALVE
Filed Jan. 14, 1926
2 Sheets-Sheet 1
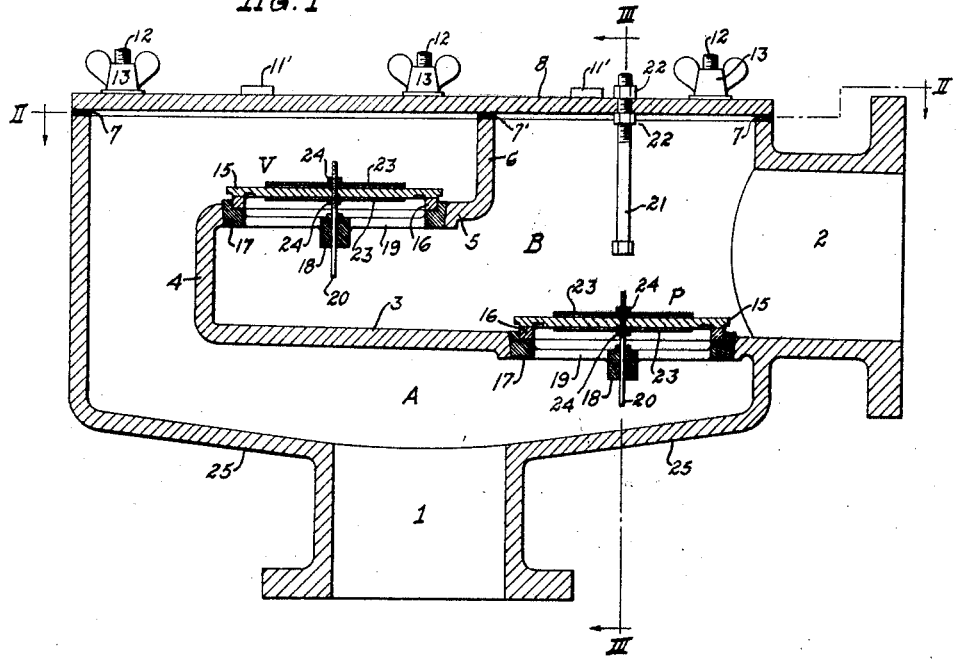
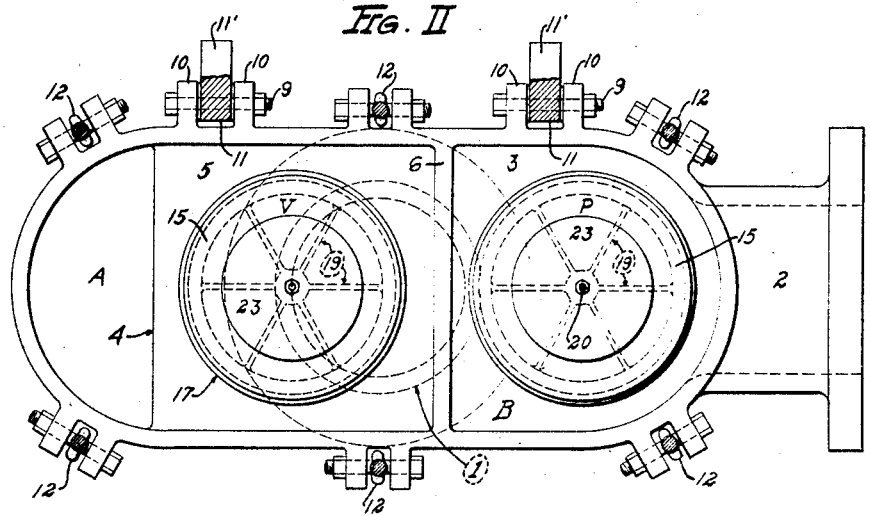
INVENTOR
M. A. CLARK
By Cook & McCauley
ATTORNEYS

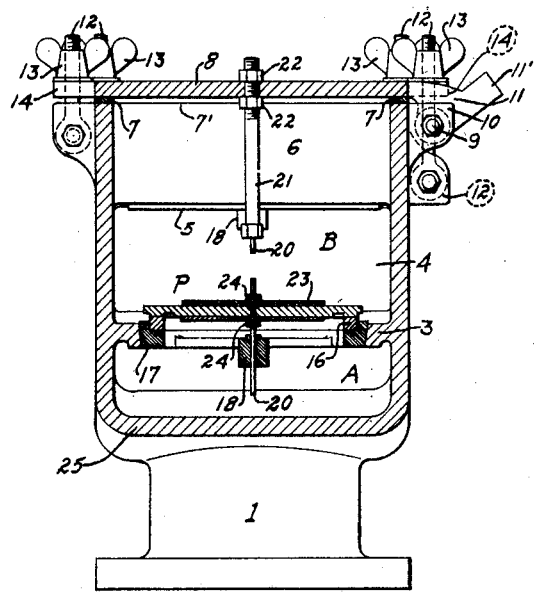
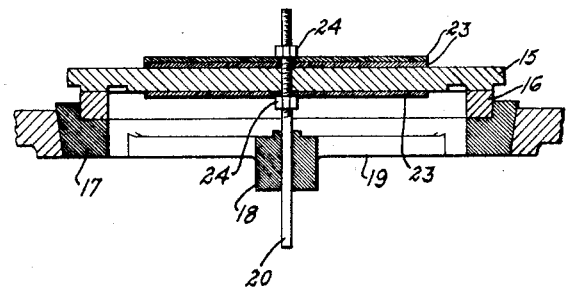

Patented May 15, 1928.

1,669,739

UNITED STATES PATENT OFFICE.

MANLEY A. CLARK, OF TULSA, OKLAHOMA.

PRESSURE-REGULATING VALVE.

Application filed January 14, 1926. Serial No. 81,139.

This invention relates to pressure-regulating valves, and the preferred form of the invention is a pressure-responsive device adapted for use on a tank, or other receptacle, containing a volatile liquid. This device can be used to close a tank, thereby preventing excessive losses due to evaporation of liquid therein, and also reducing the danger of fire or explosion by preventing free communication between the interior of the tank and the atmosphere. The device also serves as a "breather" to admit air in response to a vacuum in the tank, and to discharge vapor, or gas, in response to a predetermined pressure in the tank.

One of the objects of the invention is to produce pressure-responsive valves that are not affected by corrosion, and not liable to adhere to their seats when subjected to the predetermined pressure or vacuum. I have shown how this can be accomplished by the use of non-metallic material in the valves and valve seats.

Another object is to drain the condensate away from the valves without permitting a flow of condensate to the valve seats.

Further objects are to produce simple and effective means for guiding the valves, limiting their motions and varying their weight so as to regulate the pressure.

Another object is to produce a valve chamber adapted to be opened to expose both valves without disturbing the breather pipe or any of the other elements connected to the valve chamber.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a vertical section of a valve embodying the features of this invention.

Fig. II is a horizontal section taken approximately on the line II—II in Fig. I.

Fig. III is a section on the line III—III in Fig. I.

Fig. IV is an enlarged vertical section showing one of the valves.

The valve housing is provided at the bottom with a tubular neck 1 adapted to be connected to a tank (not shown), and a similar neck 2 extends from one side of the housing. A partition is formed between these necks to divide the housing into two compartments A and B, and this partition comprises a lower portion 3 extending from an upright portion 4 (Fig. I) to the neck 2, so as to form the bottom of compartment B, and a higher portion 5 extending from the top of the upright portion 4 so as to form part of the top of compartment B. The partition also includes an upright member 6 extending from the portion 5 to the top of the valve housing.

A gasket 7 is interposed between a closure 8 and the upper edges of the side walls of the housing, this gasket having a member 7' between the closure and the upper edge of the partition. Pivot bolts 9 connect the closure of the housing as shown in Figs. II and III, the housing having ears 10 to receive the bolts, and the closure being provided with lugs 11 arranged between the ears. To limit the motion of the closure, the lugs 11 have extensions 11' adapted to engage a side of the housing when the closure is open. The means for securing the closure comprises eye bolts 12 pivoted to the housing, as shown in Figs. II and III, and provided with nuts 13 adapted to engage lugs 14 which extend from the closure.

P designates a pressure valve adapted to open in response to pressure in the compartment A, and V designates a vacuum valve adapted to open in response to a partial vacuum in said compartment. One of my objects is to produce valves that are not liable to be affected by corrosion, and I also desire to produce valves that will open freely in response to a predetermined low pressure.

In the preferred form of the invention, each valve comprises a disk 15 made of non-metallic material such as fiber, and each valve seat is a ring 16 made of the same material arranged in a recess in a metallic holder 17. The fiber, or other non-metallic material, will not corrode and it therefore eliminates one of the serious objections to the use of valves in a low pressure breather. The top of each valve seat is flat and it contacts with a flat face on the valve, so the valve will not be wedged onto the seat and it can be readily lifted in response to the predetermined pressure.

Each valve holder 17 is in the form of a ring provided with a central guide 18 and ribs 19 connecting the guide to the ring. Each valve has a central stem 20 slidably mounted in a guide 18 below the valve. These stems also extend upwardly from the valves to limit the valve motion. The stem of the vacuum valve V (Fig. I) is adapted to engage the closure 8 while the lower end of said stem is held by the guide 18 below the valve. The means for limiting the pressure valve P comprises a bolt 21 extending downwardly from the closure 8 and adjustably secured thereto by nuts 22, as shown in Fig. I.

Metallic disks 23 are associated with the valves to perform two functions. They stiffen the non-metallic disks 15 and provide an adjustment to vary, or predetermine, the pressure at which the valves are to be opened. These metallic disks are removable and any desired number may be secured to a valve. To illustrate this feature I have shown two disks above each valve and one below, the stem 20 being extended through the disks and provided with nuts 24 whereby they are clamped to the non-metallic disk 15, as shown most clearly in Fig. IV.

In a device of this kind some of the vapors or gases will condense in the valve housing, and I have shown how to dispose of the condensate without delivering it to the valves and valve seats. The member 3 of the partition (Fig. I) is inclined downwardly from the upright member 4 to the neck 2, and this inclination is continued through the neck, thereby providing a sloping surface on which condensate is drained from the compartment B to the atmosphere, or to a breather line (not shown) connected to the neck 2. The compartment A has a bottom wall 25 inclined downwardly to the neck 1, as shown in Fig. I, to permit drainage of condensate to the neck 1 which is to be connected to the tank on which the device is used. Furthermore, the valve seats 16 extend upwardly from the partition to prevent a flow of condensate to their upper faces which contact with the valves and each valve 15 is larger in diameter than its seat 16.

The tubular neck 1 lies at the bottom of the valve housing and the neck 2 is located at one side of the housing, entirely below the closure 8, and the partition is offset so the closure can be opened to expose the valves without disturbing any of the pipes or other connections to which the necks will be attached.

The two weighted valves are held by gravity in their closed positions, and the valve P is lifted in response to pressure in the compartment A, while the other valve is lifted in response to a partial vacuum in the same compartment. Attention is directed to the arrangement whereby these results are accomplished. The vacuum valve V and its seat are located in the compartment A, and this valve is lifted by atmospheric pressure in the compartment B. The pressure valve P and its seat are located in the compartment B, and this valve is opened by superatmospheric pressure in the compartment A. The valves are thus lifted in response to directly opposite conditions, and gravity is relied upon to normally retain both valves in their closed positions. The valves are located at opposite sides of the tortuous partition wall, and the portion of the wall at one of the valves is inverted with respect to the portion at the other valve.

It is therefore unnecessary to use springs, or other uncertain contrivances, to regulate the valve action. The predetermined weight carried by each valve is an unchanging factor, so the simple and inexpensive valves can be relied upon for an indefinite period as a safety device to admit air past the vacuum valve in response to a low pressure in the tank and to discharge gases past the pressure valve in response to a predetermined pressure in the tank.

I claim:

1. In a pressure responsive valve device, a valve housing having a movable closure at the top and two vent openings in said housing, a partition extending from said closure at the top to one side of said housing and one edge of said partition being in hermetically sealed engagement with the inner face of said closure so as to prevent free communication between said vent openings, said partition comprising an upper member having an inlet port, a lower member having a discharge port, a vacuum valve closing said inlet port, and a pressure valve closing said discharge port, both valves being movably held by gravity in their closed positions and the axes of said valves being off-set vertically, and the upper edge of said partition being located between the axial lines of the said two valves whereby both of said valves are exposed when said closure is opened.

2. In a pressure-responsive valve device, a housing having vent openings, a closure movably secured to said housing, a tortuous partition wall between said openings and dividing said housing into two compartments, said partition wall extending from said closure at the top to one side of said housing and one edge of said partition wall being in hermetically sealed engagement with the inner face of said closure so as to prevent free communication between said vent openings, said partition wall having an inlet port and a discharge port, a valve closing said inlet port and adapted to yield to vacuum, and a valve closing said discharge port and adapted to yield to pressure, said valves being located at opposite sides of said partition wall, the portion of said partition wall at one of the valves being recurved with respect to the portion at the other valve location. each of said valves being yieldingly held in its closed position by gravity alone, and the axes of said valves being off-set vertically, and the upper edge of said partition being located between the axial lines of the two valves whereby both of said valves are exposed when said closure is opened.

In testimony that I claim the foregoing I hereunto affix my signature.

MANLEY A. CLARK.